United States Patent [19]
Roeder et al.

[11] 3,809,308
[45] May 7, 1974

[54] MACHINE FOR MAINTAINING CONSTANT THE DISTANCE OF A CUTTING OR WELDING TORCH FROM THE WORK PIECE

[75] Inventors: George Roeder, Frankfurt/Main; Claus Schmidt, Ebersteinburg, both of Germany

[73] Assignee: Messer Griesheim GmbH, Frankfurt/Main, Germany

[22] Filed: Feb. 16, 1973

[21] Appl. No.: 333,330

Related U.S. Application Data

[62] Division of Ser. No. 62,440, Aug. 10, 1970, Pat. No. 3,736,647.

[30] Foreign Application Priority Data
Aug. 16, 1969  Germany............................. 1941728

[52] U.S. Cl....................... 228/9, 219/124, 228/13, 266/23 M
[51] Int. Cl.............................................. B23k 5/00
[58] Field of Search........ 228/8, 9, 10, 13; 219/124, 219/131; 318/650, 563; 266/23 M

[56] References Cited
UNITED STATES PATENTS

| | | | |
|---|---|---|---|
| 2,866,145 | 12/1958 | Peaslee et al. | 318/563 |
| 3,398,342 | 8/1968 | Redman | 318/650 |
| 3,596,050 | 7/1971 | Tikijian | 219/131 |

*Primary Examiner*—J. Spencer Overholser
*Assistant Examiner*—Robert J. Craig
*Attorney, Agent, or Firm*—Ernest F. Marmorek

[57] ABSTRACT

In a torch cutting or welding machine an apparatus for maintaining constant the distance of the cutting or welding torch from a work piece being cut or welded in which the sensing electrode is secured to the torch and forms a capacitance with a surface portion of the work piece, resonant and discriminating circuits producing a predetermined voltage corresponding to a predetermined value of the capacitance and such voltage operating a positioning motor which positions the torch to establishing the original capacitance value corresponding to a predetermined distance between the torch and the work piece surface, and device for providing a signal to compensate the signal portion from the discriminator circuit in response to a change in the capacitance due to a change in the area of the sensing surface of the sensing electrode projected on the surface which otherwise would cause a further false positioning of the torch.

4 Claims, 6 Drawing Figures

MACHINE FOR MAINTAINING CONSTANT THE DISTANCE OF A CUTTING OR WELDING TORCH FROM THE WORK PIECE

This is a division of application Ser. No. 62,440, filed Aug. 10, 1970, now U.S. Pat. No. 3,736,647.

FIELD OF THE INVENTION

The present invention relates to an apparatus for maintaining constant the distance of a welding or cutting torch from a work piece surface while the torch undergoes a relative motion with respect to the surface, by making use of the change of the capacitance value which a condenser experiences during such relative motion, such condenser comprising a sensing electrode preferably connected with the torch and the work piece surface itself.

BACKGROUND OF THE INVENTION

During torch cutting by a stationary-type torch cutting machine it is important that the torch could be guided over the work piece which is being cut at a possibly constant distance.

During cutting or welding by hand the necessary height adjustments are frequently done by the operator, and such adjustments are more or less uniform only. In the event of a fixedly secured torch in machine welding or cutting many times the adjustment of the torch is performed manually by means of an appropriate spindle or gear. There is known a height adjustment method employing an electric motor which moves the slidably guided torch by means of a drive and in which the control pulses to the motor are supplied by a mechanical sensing device coming in contact with the surface of the work piece for short intervals.

It is also known to replace the mechanical sensing device by a device which operates on the principle of electrical capacity formed between the work piece and a sensing shor. (British Pat. No. 924,679).

The advantages of a contactless capacitively operating distance adjusting means over a conventional mechanical height controlling device reside in that only the first mentioned means can be employed over the entire operating speed range of a torch cutting machine, especially at higher speeds.

The disadvantages of such contactless device is found in that the control signals which operate such contactless height adjusting device are undesirably influenced by the surface discontinuities, such as, corners or edges. For example, if the sensing electrode or a portion of it projects beyond the corner or edge of the work piece, a change occurs in the value of the capacitance formed by the sensor electrode and the surface of the work piece notwithstanding the fact that the distance between the surface of the work piece and the sensor electrode did not change at all. The control device then attempts to restore the old capacitance value by making a distance adjustment between the sensor electrode and the surface. This leads to a change of the distance between the torch and the surface of the work piece which might result in a complete contact of the torch with the surface and, thereby, in a damage to the surface.

On the other hand, under the above described conditions, when the torch leaves the position at the edge or corner of the work piece and moves in the direction of the middle of the work piece, the device adjusts the distance of the torch with respect to the surface of the work piece too high, which, in turn leads to cutting discontinuities or inadequate cutting slits.

Until now the sole remedy to cure the above problem was to leave sufficiently wide scrap strips on the side around the pattern to be cut in order to keep the sensing electrode with its entire circumference over a full surface of the material to be cut. Needless to say that such remedy fell far from an optimum use of the available sheet metal. Varying according to the extent of the operation, a higher or lower quantity of scrap material had to be accounted for which the manufacturer had to write off as a pure loss. Under present day requirements the tendency is towards minimizing scrap material which, for example, should be kept within a strip width of about 5 mm around the pattern to be cut.

SUMMARY OF THE INVENTION

It is, therefore, an object of the present invention to provide a device for maintaining constant the distance of a cutting or welding torch from the surface of the work piece and which is capable of overcoming the above described disadvantages of known devices and, at the same time, is capable of meeting the high requirements made to it.

It is another object of the present invention to provide a device of maintaining constant the distance between a cutting or welding torch and the surface of a work piece which is capable of holding the waste to a minimum during cutting without the necessity for extremely accurate distance adjustments by complicated devices.

It is still another object of the present invention to provide a device for maintaining constant the distance of a cutting or welding torch with respect to the surface of the work piece which is capable of keeping the amount of scrap to a minimum and thereby be highly economical in the case of expensive steel alloys or other expensive materials such as titan, etc.

The invention provides a device for maintaining constant the distance between a cutting or welding torch and the surface of the work piece according to which the capacitance change and the consequent distance change resulting from a change of the sensing surface of the sensor electrode projected onto the surface of the work piece wherein the capacitor comprises the sensor electrode and a portion of the surface of the work piece, are compensated by a single or a plurality of correcting pulses. When the sensing electrode approaches an edge of the work piece then the correcting pulses according to the invention are introduced by a predetermined signal.

The device according to the present invention provides also that when a curved edge portion of the work piece is to be passed around, such as a corner portion of the work piece, another predetermined signal will interrupt the energizing circuit of the motor driving the distance adjusting device, which becomes connected back into the energizing circuit again by a further predetermined signal after the torch passed around the corner portion of the work piece.

The above mentioned control signals which are introduced to bring about the above described sensing process can be introduced manually or automatically.

The manual introduction of such signal is performed by the operator of the cutting torch machine who can constantly observe the path of the sensing electrode.

In the case of a numerically controlled cutting torch machine the invention provides for the automatic introduction of the above mentioned signals by electronic means, such as from an information storage device, punched tape, magnetic tape or punch cards which contain such signals in the form of auxiliary functions corresponding to the given operation.

In the case that the cutting torch machine is controlled by photoelectric means, according to the invention the automatic introduction of the above mentioned control signals is performed by additional pulse photo resistors in conjunction with pulse lines or similar devices operating on the sensed pattern.

The apparatus for practicing the above described method according to the invention comprises a device for producing the correcting pulse or pulses and which includes an external voltage source connectable into the circuit by a relay device, such correcting pulse or pulses from such external voltage source being introduced into the summation point of an operational amplifier of the capacitively operating height adjusting device.

Furthermore, it is proposed by the invention that the switching means which disconnects or connects the motor performing the distance adjustment comprises a contact operable through a relay device which in turn is energized by a predetermined signal.

BRIEF DESCRIPTION OF THE DRAWINGS

The invention will become more readily apparent from the following description of a preferred embodiment thereof shown, by way of example, in the accompanying drawings, in which.

DESCRIPTION OF THE PREFERRED EMBODIMENT

Figure 1:
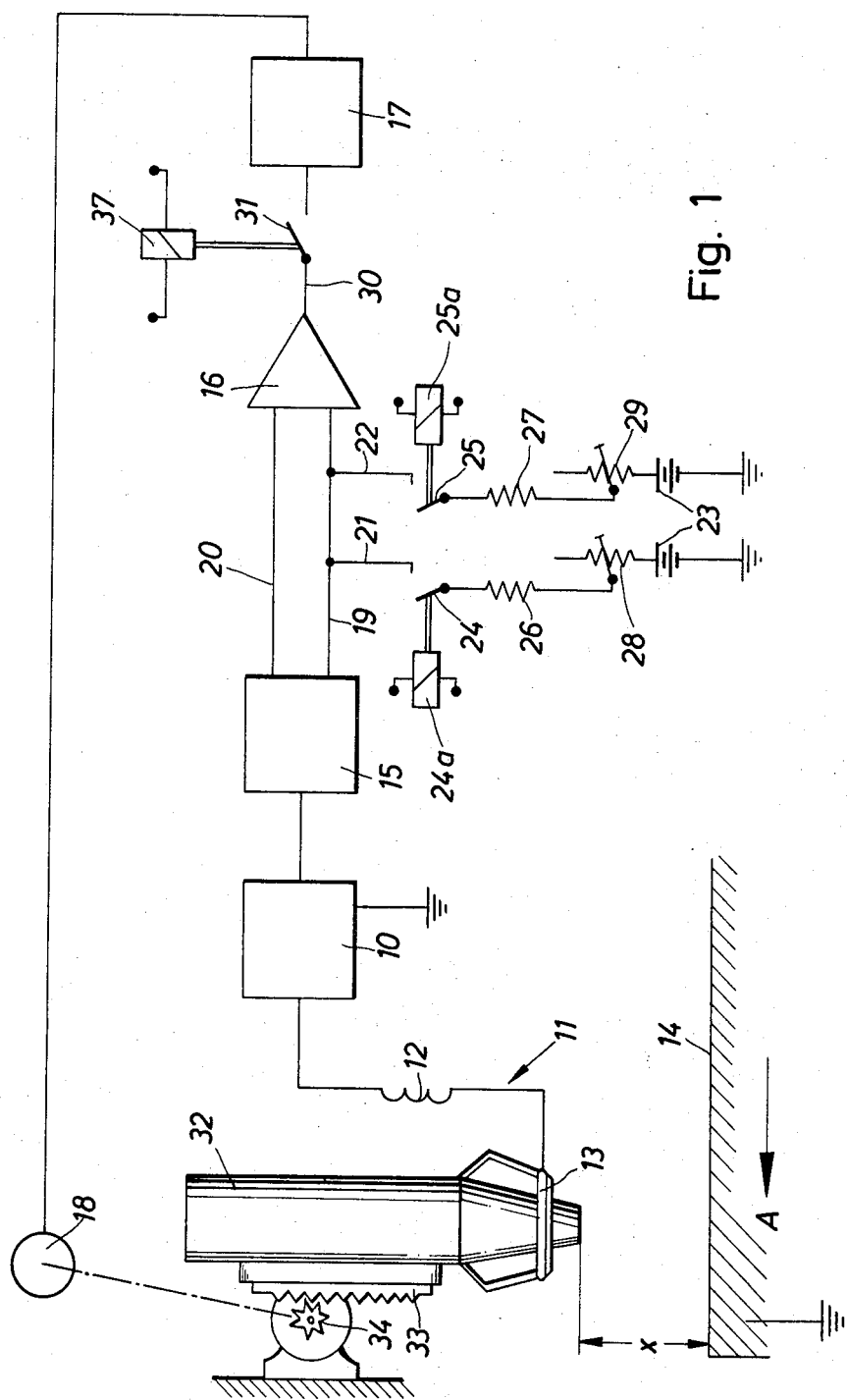
FIG. 1 is a schematic illustration of a device according to the invention for the controlling of the distance between the nozzle of a cutting torch and the surface of a work piece.

With reference to FIG. 1 it is seen that the height control device according to the present invention comprises an oscillator 10 connected to a series resonance circuit 11 which includes an inductor 12 and a capacitance which is formed by a sensing electrode 13 and a portion of a work piece 14 over which the sensing electrode 13 passes at a given instant. The control device furthermore includes a discriminator 15, an amplifier 16 which is preferably an operational amplifier and which is connected over a contact arm 31 of relay device 27 the operation of which will be described later, with a phase gate or discriminator 17 controlling the operation of a height adjusting motor 18 the operation of which will be described below. Discriminator 15 and operational amplifier 16 being interconnected by a pair of conductors 19 and 20 and, as seen in FIG. 1, a further conductor pair 21 and 22 is joined to conductor 19. Conductors 21 and 22 are connected with an external source 23 such as a battery, through contacts 21, 25 of a relay pair 24a, 25a and resistors 26 and 27, and a voltage divider formed by element 28 and 29.

The sensor electrode 13 which is preferably formed as a ring and in the embodiment illustrated in FIG. 1, is preferably being shown as secured to torch 32. On the other hand, torch 32 in the illustrative embodiment of FIG. 1 is coupled to a pinion 34 by means of a toothed rack 33 so that its height can be adjusted by control motor 18 which in turn operates pinion 34. A detailed construction of the torch device itself is not necessary to understand the aspects of the present invention involving the control of the height adjustment thereof.

The operation of the above described height adjusting apparatus is as follows:

The resonance frequency of the oscillator 10 is determined by the series resonance circuit 11. The oscillations produced by oscillator 10 are fed to the discriminator 15 where they become converted into a frequency that is to a d.c. signal proportional to the sensor electrode-work piece surface distance. In the case when the sensor electrode 13 is with its entire surface located over the surface 14 of the work piece, then oscillator 10 delivers oscillations corresponding to the mean frequency of the discriminator 15 whereupon similar output voltages appear on both conductors 19 and 20. Then, amplifier 16 connected to conductors 19 and 20 will deliver no positioning signal to the control motor 18 to conductor 30, contact arm 31 and phase discriminator 17 coupled to its output. To the above described balanced condition the position of the torch 32 with respect to the surface of the work piece 14, as shown in FIG. 1, can correspond, such distance between the nozzle of the torch 32 and the surface 14 being indicated by "X."

Should torch 32 and together therewith sensor electrode 13 move in the direction of arrow A over the surface of the work piece 14, then the distance between the sensor electrode 13 and the surface of the work piece 14 will change due to any discontinuity on the path along arrow A. In the event that the surface 14 has a projection protruding therefrom, then the distance "X" becomes smaller. As a result, the oscillating frequency of the oscillator 10 also changes. The new oscillating frequency will not any more correspond to the mean frequency of the discriminator 15 and, consequently, uneven output voltages appear on conductors 19 and 20. The amplifier 16 coupled to conductors 19 and 20 will receive an input whereupon it will deliver a positioning signal to control motor 18. Control motor 18 will then lift the torch 32 through the pinion-rack combination 33, 34 as far up until the original distance "X" becomes restored and the oscillations delivered by the oscillator 10 will again correspond to the mean frequency of the discriminator 15. In the event, that there is a recess in the surface of the work piece 14, again a positioning signal will be delivered to the control motor 18 which in turn operates to lower the torch 32 to attain the originally set distance "X."

In the event that the torch 32 passes over an edge portion 35 of the work piece, then in the known devices described above due to the reduction of the sensed surface which defines the capacity between the sensor electrode 13 and the surface 14 of the work piece, the capacity and thereby the oscillating frequency of oscillator 10 would change causing a shifting of discriminator 15 out of its balanced condition. The voltage difference between the conductors 19 and 20 at the output of the discriminator 15 would then lead to a positioning signal for the control motor 18 which in turn would move the sensor electrode 13 and torch 32 over the work piece surface 14 as long until the original capacitance value and thereby the original mean frequency of the discriminator 15 would be reached.

Figure 2:
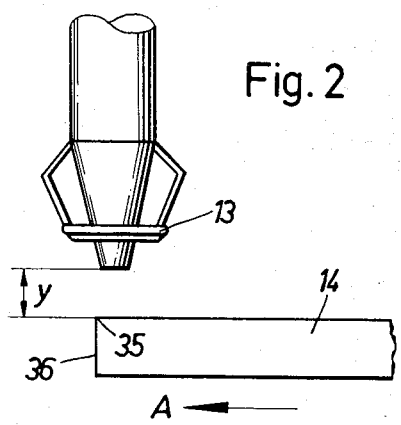
FIG. 2 shows the nozzle according to FIG. 1 in another position.
Figure 3:
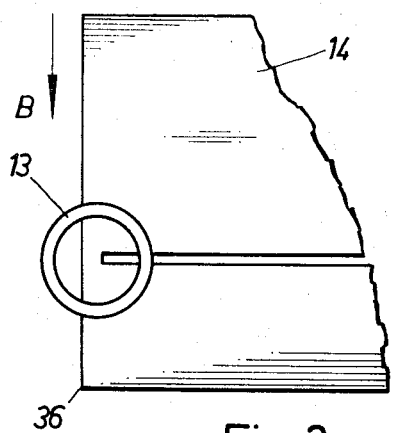
FIG. 3 is a top view according to FIG. 2.

FIG. 2 and also FIG. 3 illustrate the above-described events which could happen in a known device not having the benefit of the present invention and, in which, thereby, a distance of the torch 32 with respect to the surface 14 could reach a value designated by "Y." FIG. 3 shows the position of the sensor electrode 13 illustrated in FIG. 2 in a plan view.

In order that even in a situation illustrated in FIGS. 2 and 3 a distance "X" could be kept between the torch 32 and the work piece 14, the invention provides for a correcting pulse derived from the external voltage source 23 and supplied to the summation point of amplifier 16 through the voltage divider elements 28, 29 and contacts 24, 25 respectively.

This correcting pulse is selected in its magnitude and polarity in such a manner that on both inputs of the amplifier 16 equal voltages appear despite the imbalance of the discriminator 15. As a result of such arrangement, a height adjustment process is prevented. The distance "X" between torch 32 and the work piece surface 14 remains constant. Such a pulse-providing arrangement makes it also possible that during a movement of torch 32 in the direction of arrow B(FIG. 3) along the edge 35 of the work piece the distance "X" referred to in FIG. 1 can be kept. In the event that during the sensing process of the work piece surface 14 there is a projection of the surface in the region of the edge portion 35 of the work piece or there is a recess similarly located, a further imbalance of the discriminator 15 is caused by such projection or recess. Such additional imbalance will become however not compensated by the correcting pulse but it will operate to provide a control signal for motor 18 causing a lifting or lowering of the torch 32, so that the distance between the torch 32 and the work piece surface 14 becomes set again at the desired distance "X."

Contacts 24 and 25 are operated by means of the relay 24a, 25a as shown in the illustrative embodiment of FIG. 1. The energization of these relays is performed, for example, manually by the operator of the torch cutting machine (in which instance the operator must carefully follow the path of the sensor electrode 13), or automatically, such as in a punched tape controlled machine by the delivery of appropriate auxiliary functions or, automatically in the event the machine is controlled by photo-electric devices which in turn control such relay by additional pulse photo resistors in conjunction with appropriate pulse lines provided on the pattern which is to be sensed.

The accuracy of the height adjusting device as far as speed of control and accuracy of control is concerned will not be effected by the type of device which might be selected from the above described devices to be used for the introduction of the correcting pulses to the summation point of amplifier 16.

It is within the scope of the invention that the compensation can be had in several stages by using any number of voltage dividers or contacts which have been shown in the illustrating embodiment only as a pair of contacts 24 and 25 and a pair of voltage dividers 28, 29. By using several stages of compensation it becomes possible to compensate the different type of edge passes of the sensing electrode 13 over edge 35 in a stepwise manner.

Figure 4:
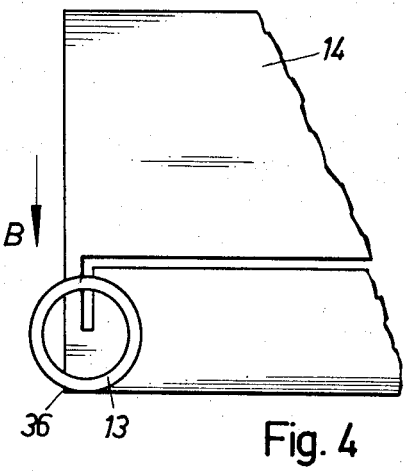
FIGS. 4, 5 and 6 illustrate further positions of the sensing electrode in top view.
Figure 5:
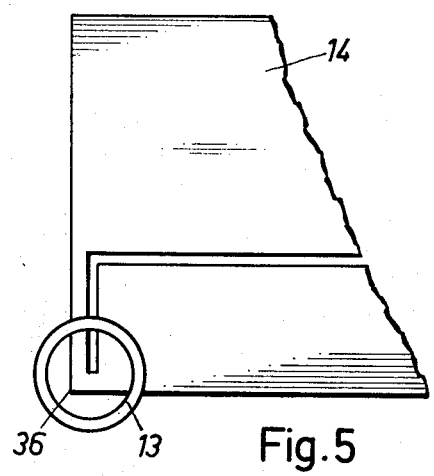

FIG. 4 shows a situation similar to FIG. 3. Here, however, the sensor electrode 13 and the torch device 32 therewith moves in the direction of the arrow B until it reaches the corner 36 of the work piece as seen in FIG. 5.

Figure 6:
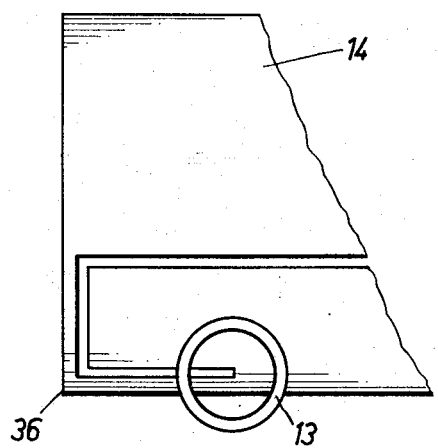

At the latest when the sensor electrode 13 reached the position shown in FIG. 4 the relay 37 shown in FIG. 1 becomes either manually numerically (in the event of punched tape operation) or photoelectrically energized which then causes contact 31 to interrupt the energization of the positioning motor 18. After this no more height compensation will be given to the motor 18. This situation will be sustained as long until the corner 36 of the work piece has been passed and until the sensor electrode 13 reaches a position shown in FIG. 6. After this the lock-out of the height compensation device becomes lifted by the energization of relay 37 manually or by another signal so that motor 18 will be able to receive positioning signals again.

In the last described embodiment of the invention it is assumed that the sensor electrode 13 moves from the direction of the middle of the work piece 14 towards an edge portion of the work piece. In this case the capacity of the sensor electrode 13 becomes decisive in the determination of the d.c. voltage of the discriminator 15 proportional to the frequency, that is, to the distance, when the sensor electrode 13 is located over the surface 14 of the work piece with its entire sensing surface.

It is also possible, however, and is within the scope of the present invention that the sensor electrode 13 has only a portion of it, that is a portion of its sensing surface, over the surface 14 of the work piece and the capacitance formed thereby and determining the oscillating frequency of oscillator 10 in conjunction with inductor 12, under these conditions the resulting oscillating frequency can be used as the mean frequency of discriminator 15.

If the last mentioned features of the present invention would be applied to known devices and the sensor electrode would move towards the middle of the work piece, then the capacitance would increase due to the increasing sensing surface whereby the discriminator 15 would become imbalanced. As a result the voltage difference appearing between the conductors 19 and 20 of the discriminator 15 would call for a positioning signal for the control motor 18 thereby the torch 32 would be lifted off from the surface so far until the capacitance of the sensor electrode 13 and the surface 14 of the work piece would reach its original value.

Inasmuch as the above described changes in the distance between the torch 32 and the surface of the work piece 14 are undesirable, the invention provides that the correcting pulse should be supplied to the summation point of the amplifier 16. Such correcting pulse is selected in its magnitude and polarity in such a manner that on both inputs of amplifier 16 equal voltages will appear despite the imbalance of the discriminator 15 whereby an undesired positioning of the control motor 18 is avoided.

From the above, it is apparent that although the invention has been described hereinbefore with respect to a specific embodiment and preferred method thereof, it is evident that many modifications and changes may be made without departing from the spirit

We claim:

1. For use with a torch cutting or welding machine, an apparatus for maintaining constant, a predetermined distance between the cutting or welding torch and a work piece having a work piece surface to be cut or welded comprising: a sensing electrode means secured to said torch, said electrode means forming a capacitance with said work piece surface, means for producing a predetermined voltage magnitude corresponding to a predetermined value of said capacitance, said predetermined value corresponding to said predetermined distance, a first means for producing a first signal in response to changes of said capacitance due to variation from said predetermined distance positioning means responsive to said first signal to position said torch for establishing said predetermined capacitance value and a second means for producing a second signal to compensate the first signal from said first signal producing means for variations formed in response to a second change in said capacitance due to a change in the area of a sensing surface of said sensing electrode means projected on said work piece surface.

2. The combination as claimed in claim 1, wherein said second signal producing means comprises a voltage source, and a relay means, said relay means connecting said voltage source into the path of said first signal producing means.

3. The combination as claimed in claim 2, wherein said first signal producing means comprises a resonance circuit including said capacitance, a frequency discriminator connected to said resonance circuit and developing said first signal proportional to said distance between said sensing electrode means and said work piece surface, an operational amplifier means connected to said discriminator to energize said positioning means, said second signal being applied to the input of said amplifier means in response to a first predetermined signal.

4. The combination as claimed in claim 3, further including a contact means connected at the output of said amplifier means for selectively de-energizing said positioning means in response to a second predetermined signal.

* * * * *